(12) United States Patent
Erb et al.

(10) Patent No.: US 7,784,853 B2
(45) Date of Patent: Aug. 31, 2010

(54) PROTECTION DEVICE FOR MOTOR VEHICLES

(75) Inventors: Daniel Erb, Ludwigsburg (DE); Joern Wiemer, Illingen (DE); Peter Neumann, Oberstenfeld (DE); Joerg Riehle, Asperg (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 355 days.

(21) Appl. No.: 11/803,723

(22) Filed: May 14, 2007

(65) Prior Publication Data

US 2008/0067834 A1 Mar. 20, 2008

(30) Foreign Application Priority Data

May 19, 2006 (DE) ........................ 10 2006 024 641

(51) Int. Cl.
*B60J 7/22* (2006.01)
(52) U.S. Cl. ...................................... 296/180.1; 296/85
(58) Field of Classification Search .............. 296/180.1, 296/180.5, 84.1, 85, 86, 91
See application file for complete search history.

(56) References Cited

U.S. PATENT DOCUMENTS

| 5,265,930 A | 11/1993 | Klein et al. | |
| 6,672,657 B2 * | 1/2004 | Biecker et al. | .............. 296/217 |
| 2002/0175539 A1 | 11/2002 | Biecker et al. | |
| 2007/0040413 A1 | 2/2007 | Rimmelspacher et al. | |

FOREIGN PATENT DOCUMENTS

| DE | 41 00 240 | | 3/1992 |
| DE | 200 22 872 | | 6/2002 |
| DE | 101 02 662 | | 7/2002 |
| DE | 10102662 A1 | * | 7/2002 |
| DE | 101 05 598 | | 8/2002 |
| DE | 103 20 108 | | 12/2004 |
| DE | 10 2005 018 490 | | 11/2006 |
| DE | 102005062614 A1 | * | 6/2007 |
| EP | 1 053 900 | | 11/2000 |
| EP | 1 621 386 | | 2/2006 |
| EP | 1 707 414 | | 10/2006 |
| EP | 1 736 342 | | 12/2006 |

* cited by examiner

Primary Examiner—Glenn Dayoan
Assistant Examiner—Melissa A Black
(74) Attorney, Agent, or Firm—Lipsitz & McAllister, LLC

(57) ABSTRACT

In order to design a protection device for motor vehicles, comprising a protection element protecting again draft and/or radiation, wherein for the mounting on a motor vehicle body the protection device has two fixing devices which are arranged on oppositely located sides and in which at least one locking element movable back and forth between an operative position and an inoperative position is mounted, so that it is easier to mount it is suggested that the fixing devices be coupled by means of a coupling device in such a manner that the at least one locking element of the one fixing device and the at least one locking element of the other, oppositely located fixing device can be transferred together from the operative into the inoperative position.

22 Claims, 13 Drawing Sheets

1. Position - 0°

2. Position - 60°

3. Position - 80°

4. Position - 92°

PROTECTION DEVICE FOR MOTOR VEHICLES

This patent application claims the benefit of German Application No. 10 2006 024 641.1, filed May 19, 2006, the teachings and disclosure of which are hereby incorporated in its entirety by reference thereto.

The invention relates to a protection device for motor vehicles, comprising a protection element which protects against draft and/or radiation, wherein the protection device has two fixing devices arranged on oppositely located sides for the mounting on a motor vehicle body, at least one locking element movable back and forth between an operative position and an inoperative position being mounted in each fixing device.

Protection devices of this type for motor vehicles are known.

The fixing devices can, in these cases, normally be actuated individually.

Any mounting or dismounting of a protection element with fixing devices which can be actuated individually is, however, complicated and laborious, especially when the protection element must be held, in addition, in its position on the motor vehicle bodywork.

The object underlying the invention is, therefore, to design a protection device of the generic type so that it is easier to mount.

This object is accomplished in accordance with the invention, in a protection device of the type described at the outset, in that the fixing devices are coupled by means of a coupling device in such a manner that the at least one locking element of the one fixing device and the at least one locking element of the other, oppositely located fixing device can be transferred together from the operative into the inoperative position.

The advantage of the solution according to the invention is to be seen in the fact that, with it, it is at least possible to reach the inoperative position of the locking elements in a simple manner and, therefore, to simplify the handling at least during the detachment of such a protection element.

The coupling device can be designed in the most varied of ways. For example, it would be conceivable to design the coupling device such that this is not only in a position to transfer the locking elements actively from their operative position into their inoperative position but also in a position to transfer the locking elements actively from their inoperative position into their operative position.

One advantageous alternative provides for the coupling device to be designed such that, with it, an active action on the locking elements is possible only during their transfer from the operative position into the inoperative position.

The advantage of this solution is to be seen in the fact that, with it, it is, therefore, possible to release the locking elements in such a manner that they have the possibility of changing over from the inoperative position into the operative position independently of one another.

The coupling device can, in this respect, be designed in the most varied of ways. For example, it would be conceivable to design the coupling device to be electric, i.e., for example, to realize the functioning of the coupling device via electric drives which can be activated at the same time.

In order to achieve as inexpensive a solution as possible, it is expedient when the coupling device has a mechanical coupling element.

Such a mechanical coupling element may be designed in the most varied of ways.

It is possible with a mechanical coupling element not only to act on the locking elements actively in the sense of movement thereof from the operative into the inoperative position or also to act, in addition, actively in the sense of movement thereof from the inoperative into the operative position.

One advantageous solution provides for the coupling element to be a traction element.

A traction element is, first of all, primarily suitable only for the purpose of acting in one direction on the locking elements, for example, during the movement thereof from the operative position into the inoperative position.

It is, however, also conceivable to provide two traction elements or an endless traction element which act in a crossover manner and, therefore, act actively not only in the sense of a transfer of the locking elements from the operative position into the inoperative position but also in the sense of a transfer of the locking elements from the inoperative into the operative position.

An active action is to be understood such that a positively guided movement in the respective direction of movement takes place and so movement of one of the locking elements leads automatically to movement of the other, oppositely located locking element.

Such a traction element can be designed in the most varied of ways. For example, every element which can be subjected to pull can be used, for example, a chain. A particularly simple solution provides for the traction element to be a traction cable.

Actuation of the locking elements can take place in the most varied of ways.

For example, it would be conceivable to act directly on the coupling device for the actuation of the locking elements.

Such action on the coupling device, for example, on a mechanical coupling element may take place directly on this as a result of turning or deflection of the same.

It is, however, also conceivable to act directly on one of the locking elements in order to move the other, oppositely located locking element, as well, on account of the coupling by means of the coupling device.

In order to make such actions easier for an operator, it is preferably provided for the protection device to be provided with at least one actuating element.

Such an actuating element is preferably an element operated by hand, with which either action on one of the locking elements or action on the coupling device is possible.

When only one actuating element is provided, there is, however, the problem that this must be located unfavorably from an ergonomic point of view when it is intended for it to be accessible from both sides of the motor vehicle and so only an arrangement in a central area of the protection device may be realized.

For this reason, it is preferably provided for an actuating element to be associated with each of the fixing devices so that an actuating element is available at each of the fixing devices in an ergonomically favorable manner and, therefore, on each side of the protection device.

Such an actuating element is preferably arranged close to the respective locking element, in particular, in the housing of the respective fixing device.

In this respect, the actuating element can be designed such that, with it, action on the locking element and/or action on the coupling device is possible.

A favorable solution from a mechanically functional point of view provides for the actuating element to act on the coupling device.

It is advantageous, in particular, when the actuating element acts on the traction element of the coupling device in the sense of a translation from areas interacting with the respective locking elements to the coupling element.

In the simplest case, this may be realized in such a manner that in the case of each of the locking elements the areas connected to the locking elements move in the sense of the same movement of the locking elements, i.e., for example, in the sense of movement of the locking elements from the operative position into the inoperative position.

In the simplest case, such an actuating element, in the case where a traction element is used as coupling element, causes a variation in an extension or size of a wrap-around loop in one section of the traction element.

With respect to the securing of the actuating elements in certain positions, no further details have so far been given. One advantageous embodiment, for example, provides for the actuating element to be securable in a position maintaining an inoperative position of the locking elements.

In this respect, the actuating element can preferably be locked in this position.

In the simplest case, it is provided for the actuating element to have a snap-in element which can be interlocked with a stationary snap-in element.

The snap-in connection of the actuating element always takes place such that the snap-in connection can, on the one hand, be brought about manually and can, on the other hand, be released again manually.

Such a manual release of the snap-in connection can be realized in different ways.

It is possible to design the snap-in elements such that when a suitable torque is applied the snap-in elements can disengage again, for example, as a result of movement of the one snap-in element over the other snap-in element.

In this case, the flanks, with which the snap-in elements abut on one another in the snap-in position, are, in particular, to be beveled accordingly.

Alternatively, it is conceivable to design the snap-in elements such that they snap in securely and cannot be moved over one another in an opposite direction as a result of a torque being applied.

In this case, an element for the movement of the one snap-in element in relation to the other one is to be provided so that as a result of active action on one of the snap-in elements the snap-in elements can be brought to such a distance that the snap-in elements can move over one another.

If, for example, one of the snap-in elements is arranged on a member supporting it, the entire member can be moved away from the respectively other snap-in element, as a result of active action on it, to such an extent that they can be moved over one another free from any interaction.

In all these cases, the member supporting the respectively movable snap-in element, for example, the traction cable tensioning member is preferably acted upon by a spring elastic element in such a manner that the snap-in elements are moved towards one another as a result of the spring elastic element to such an extent that the snap-in elements interact.

With respect to the design of the locking elements, no further details have so far been given.

One advantageous embodiment, for example, provides for the locking elements to be acted upon by an elastic force storing means in the direction of their operative position.

Such a solution has the great advantage that, with it, the locking elements, irrespective of any action on them, always have the tendency to take up their operative position and remain in it.

In this respect, it is ensured, therefore, that the locking elements also always have the tendency to secure the protection device reliably in the motor vehicle by taking up their operative position.

In this respect, each of the locking elements preferably has its own elastic force storing means associated with it so that each of the locking elements is acted upon by such a force storing means independently of the other.

In order to simplify the handling of the protection device according to the invention, in particular, during mounting it is preferably provided for a movement coupling to be provided between the respective locking element and the actuating element associated with it, this movement coupling bringing about different movements of the locking elements.

As a result, the locking elements coupled via the coupling device may, for example, be moved at different speeds and/or one after the other and, as a result, the mounting or dismounting of the protection device is made easier for an operator.

Such a movement coupling offers, for example, the possibility, in addition, of influencing the movement of the locking element associated directly with the actuating element irrespective of the position of the actuating element.

The movement coupling is preferably designed such that during any action on an actuating element in the sense of a transfer of the locking elements from the inoperative position into the operative position the locking element of the oppositely located fixing device transfers first of all into the operative position and then the locking element associated with this actuating element with a delay.

The movement coupling is preferably designed as a blocking device which first of all blocks any transfer of the locking element associated with the actuating element from the inoperative position into the operative position and releases it only when the actuating element, on account of its position, has permitted the other locking element to transfer into the operative position.

Such a solution has the great advantage that it makes it possible for an operator to mount the protection device in a simple manner, namely due to the fact that the one locking element transfers first of all into the operative position for fixing the protection device on the vehicle body and then, subsequently, the other locking element. This is favorable, in particular, when the protection device is not completely rigid per se and is deformed during the mounting so that the two locking elements can be brought into operative connection with the vehicle body at the same time only with difficulty.

With respect to the design of the protection device itself, no further details have so far been given. One advantageous embodiment, for example, provides for the protection device to be designed as a sun protection device mountable in a motor vehicle.

Another possibility provides for the protection device to be designed as a wind stop device.

Such a wind stop device can be designed in the most varied of ways. The simplest solution provides for the wind stop device to have a wind blocker which can be mounted on a convertible vehicle rising above a belt line thereof.

Another advantageous solution provides for the wind stop device to have a cover and a wind blocker connected to it.

Such a cover serves the purpose, for example, of covering a passenger compartment located behind a front row of seats.

In this respect, the cover and the wind blocker are preferably connected to one another in an articulated manner so that the wind blocker can be aligned at various angles in relation to the cover.

In order to be able to stow such a protection device in a simple manner, provision is preferably made that the protection device can be folded together.

In the simplest case, the wind blocker can be folded onto the cover.

In even more advantageous cases, the unit consisting of wind blocker and cover can be folded together again, for example, can be folded relative to one another about a central axis parallel to a longitudinal central axis of the motor vehicle.

Additional features and advantages of the invention are the subject matter of the following description as well as the drawings illustrating several embodiments.

Figure 1:
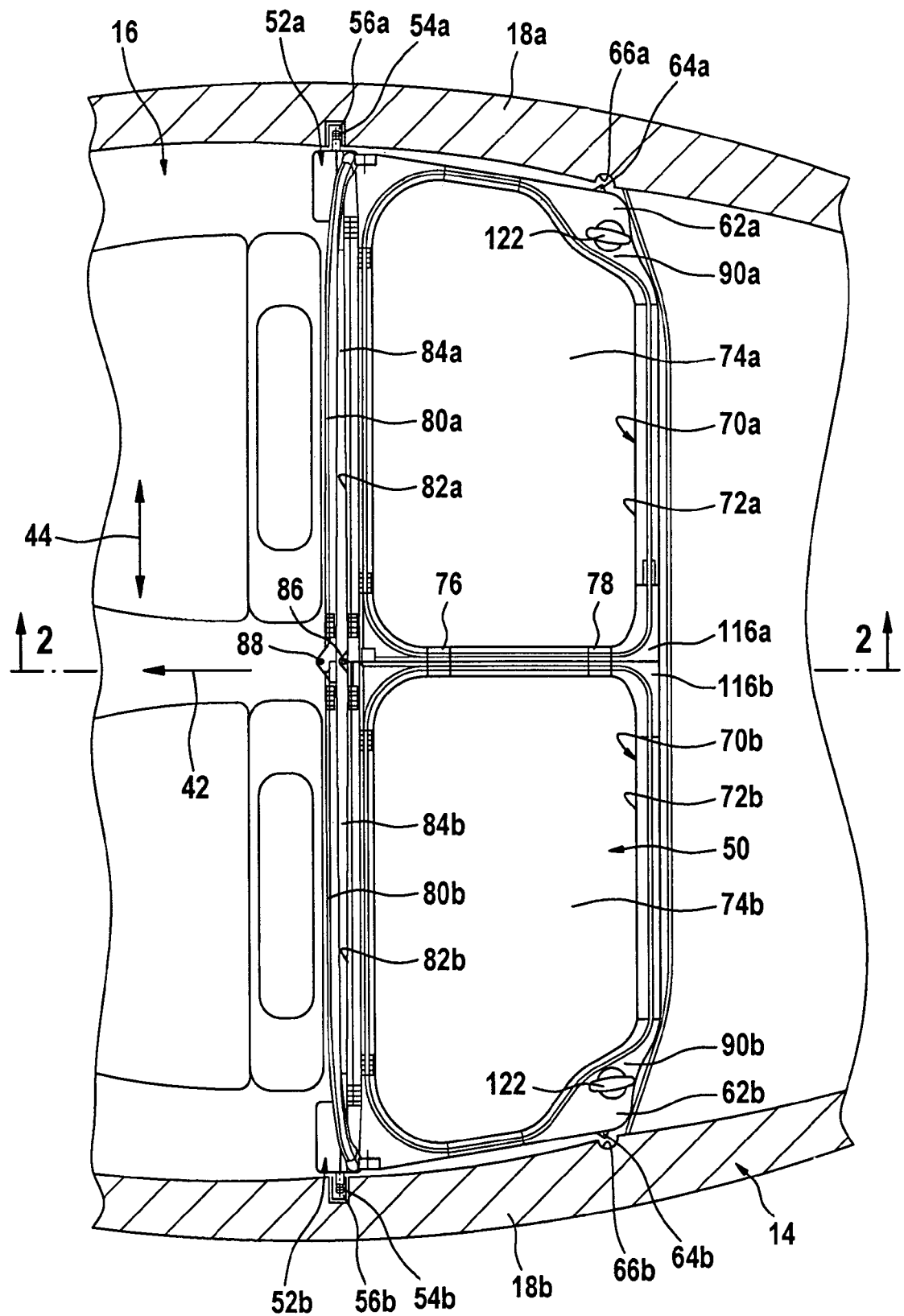
FIG. 1 shows a view from above onto a convertible vehicle with a first embodiment of a protection device in accordance with the invention, designed as a wind stop device.
Figure 2:
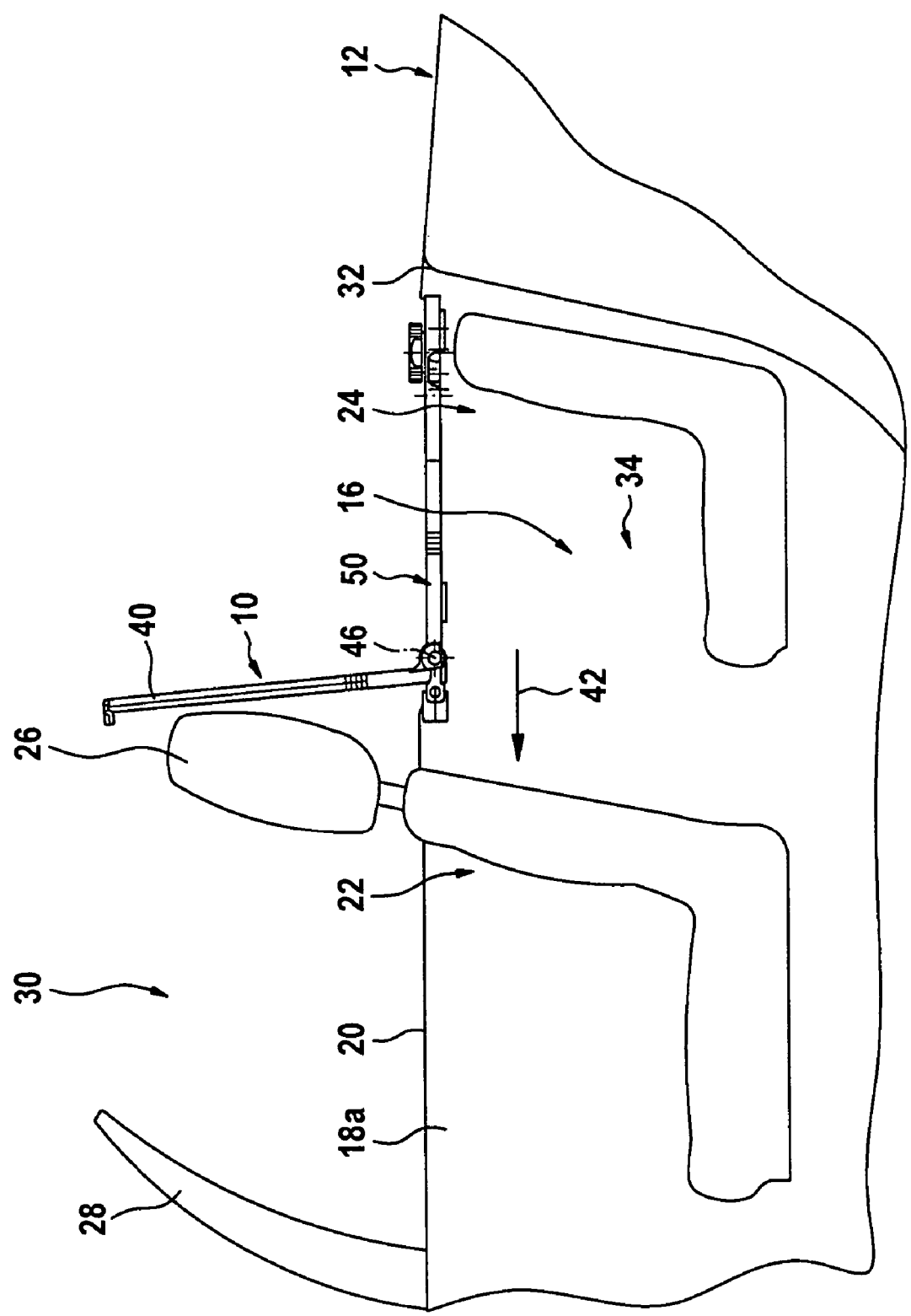
FIG. 2 shows a section along line 2-2 in FIG. 1.

One embodiment of a convertible vehicle 12 to be provided with a protection device 10 according to the invention comprises a vehicle body 14 with a passenger compartment 16 which is enclosed to the side by side walls 18a, b which rise up as far as a belt line 20 of the vehicle body.

In this respect, a front row of seats 22 and a rear row of seats 24 are provided in the passenger compartment 16, wherein the rear row of seats 24 need not be a full row of seats but can also comprise narrow spare seats.

Furthermore, the rear row of seats 24 can also be omitted in one variation of the vehicle body 14 according to the invention and, instead of this, merely a luggage storage area of the passenger compartment 16 be provided.

The front row of seats 22 projects above the belt line 20 of the vehicle body 14 at least with headrests 26 and a headroom area 30 of the passenger compartment 16, in which draft phenomena occur in the known manner due to swirling air, is located between a windshield unit 28 of the vehicle body 14 and the headrests 26 of the front row of seats 22.

For this reason, the protection device 10 mounted on the convertible vehicle is provided with a wind blocker 40 which rises above the belt line 20 behind the headrests 26, essentially extending transversely to the belt line 20. An alignment of the wind blocker 40 transversely to the belt line 20 is to be understood as an alignment thereof, with which the wind blocker 40 forms with the belt line 20 an angle in the range of approximately 60° to approximately 120°.

In order to cover the area 34 of the passenger compartment 16 located above the rear row of seats 24 and below the belt line 20, the protection device 10 is also provided with a cover 50 which extends at the level of the belt line 20 of the vehicle body 14 and approximately parallel to it from the wind blocker 40 as far as a rear end area 32 of the passenger compartment 16.

In the case of the protection device according to the invention, the wind blocker 40 and the cover 50 are connected to one another to form one unit, wherein the wind blocker 40 is pivotable relative to the cover 50 preferably about a pivot axis 46 extending transversely to a longitudinal direction 42 of the vehicle and parallel to a transverse direction 44, wherein the wind blocker 40 can be pivoted about the pivot axis 46 into a folded position, in which the wind blocker 40 extends approximately parallel to the cover 50, and can be pivoted into an unfolded position, in which the wind blocker 40 is operative and located in the said angular range of approximately 60° to approximately 120° in relation to the cover 50.

The entire protection device 10 can be fixed to the vehicle body 14 in a releasable manner by means of several fixing devices, namely by means of two first fixing devices 52a, b which are arranged on oppositely located sides in the transverse direction 44 close to the pivot axis 46 and have first locking bolts 54a, b which can be moved into first receiving means 56a, b provided in the side walls 18a, b of the vehicle body 14 in order to fix the protection device 10 close to the pivot axis 46.

Furthermore, second fixing devices 62 are provided on the cover 50 and these are likewise arranged on sides of the cover 50 located opposite one another in the transverse direction 44 and have second locking elements 64a, b which can be brought into engagement with receiving means 66a, b in the side walls 18, b of the vehicle body 14.

In principle, the cover 50 could be designed as a one-piece flat part, in which the fixing devices 52 and 62 are arranged on oppositely located sides.

In one embodiment illustrated, the cover 50 is preferably formed from two frame parts 70a and 70b which surround openings 72a, 72b, wherein the openings 72a, 72b are closed by flat material 74a, b held by means of the frame parts 70a, b so as to be tensioned. In this respect, the flat material 74a, b is preferably designed as flat material which is permeable to air in a limited manner but prevents any flow of air.

In addition, the two frame parts 70a, b are connected to one another, for example, by hinge systems 76, 78 so that the cover 50 can be folded together as a whole such that one of the frame parts 70a, b lies on the respectively other one of the frame parts 70b, a.

In the same way, the wind blocker 40 is also designed as a flat member; this is, however, preferably not designed as a flat body but is likewise formed from two frame parts 80a, 80b which surround openings 82a, 82b, wherein flat material 84a, 84b likewise extends in the openings and is held by the frame parts 80a, 80b so as to be tensioned.

The frame parts 80a, 80b are preferably connected to one another in an articulated manner by means of hinges 86, 88.

Figure 3:
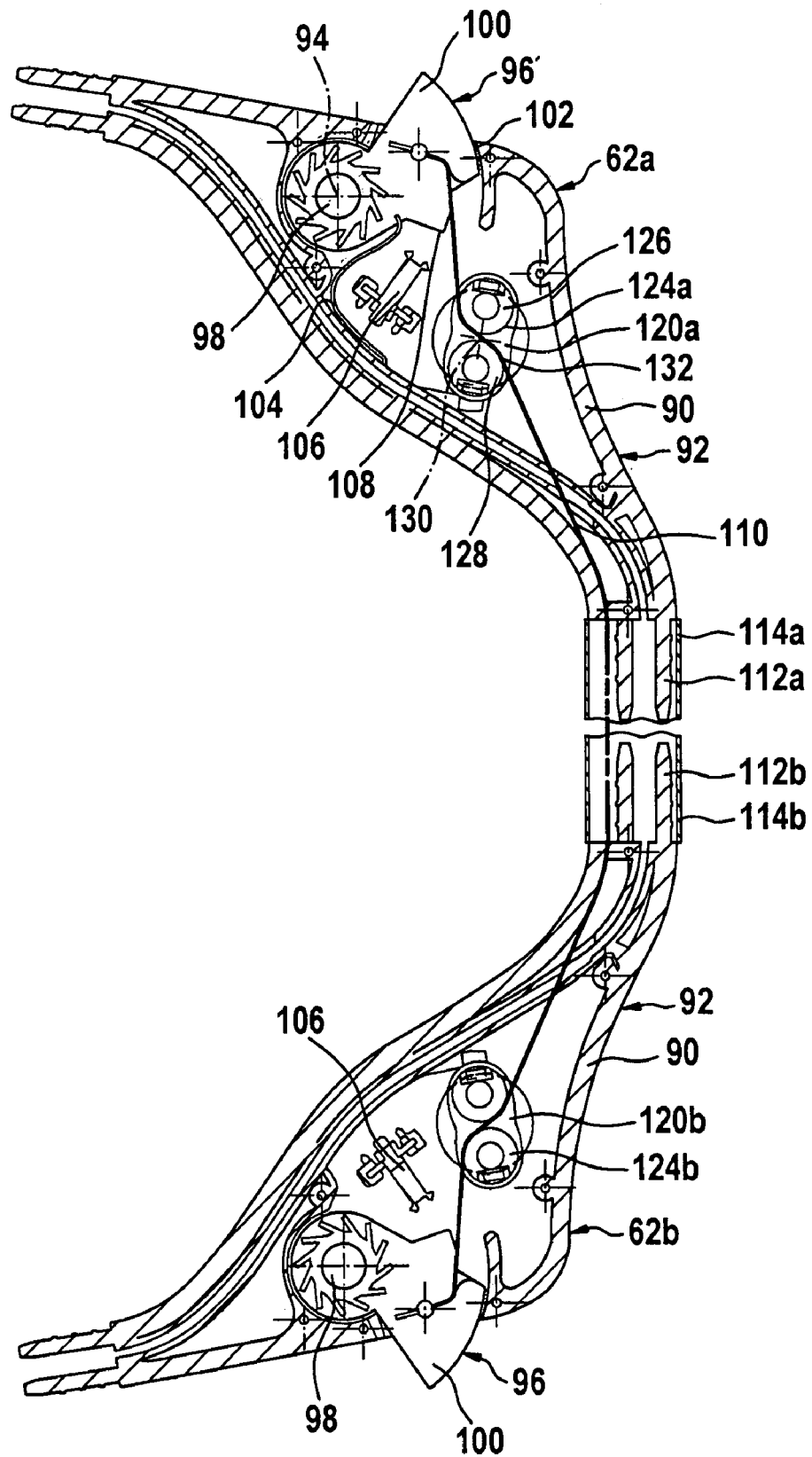
FIG. 3 shows a sectional illustration of two fixing devices arranged on oppositely located sides of the protection device and designed as corner pieces of a cover, in operative position of locking elements thereof.
Figure 4:
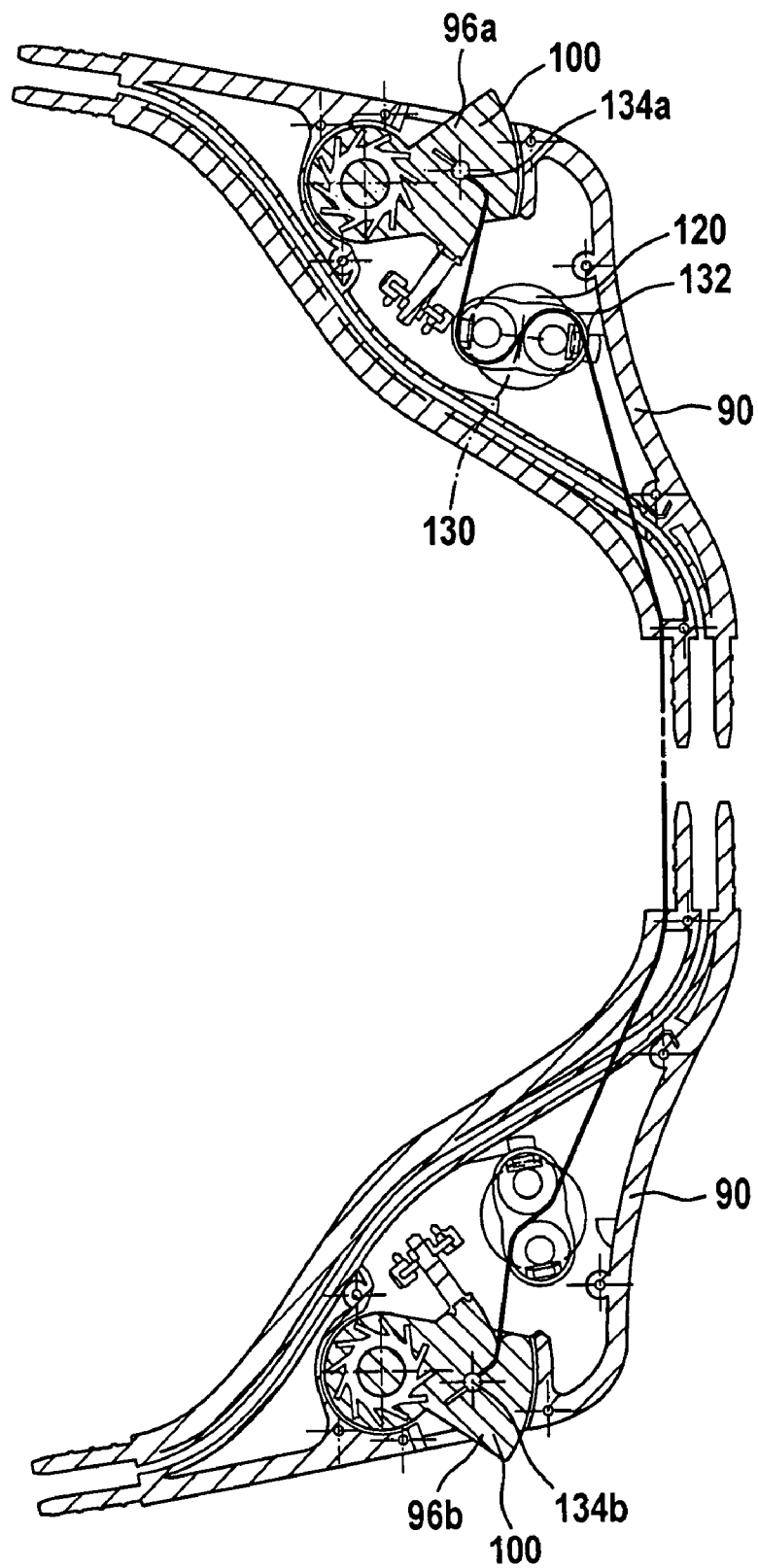
FIG. 4 shows an illustration similar to FIG. 3 in inoperative position of locking elements thereof.

As illustrated in FIGS. 3 and 4, each of the two fixing devices 62a, b has a housing 90 which is formed, for example, in the illustrated case by a section of the frame part 70, for example, a corner piece 92 of the frame part 70.

A swivel locking element 96 pivotable about an axis of rotation 94 is rotatably mounted in the housing 90 with a bearing member 98, wherein the swivel locking element 96 has, next to the bearing member 98, a locking tongue 100 which can be pivoted outwards through an exit opening 102 of the housing 90.

In FIG. 3, the locking tongue 100 is illustrated in its outwardly extended, operative position whereas the locking tongue 100 in FIG. 4 is illustrated in an inoperative position drawn into the housing 90.

For the purpose of pivoting the swivel locking element 96 in such a manner that the locking tongue 100 is in the outwardly extended position, this is acted upon by a spring 104 such that the swivel locking element 96 always endeavors to move into the position, in which the locking tongue 100 is extended completely out of the housing 90.

For the purpose of securing the drawn-in position, a stop 106 is provided, as illustrated in FIG. 4, against which the locking tongue 100 can abut with a side edge 108 in its drawn-in position.

The swivel locking elements 96 of the two second fixing devices 62a and 62b arranged on oppositely located sides of the protection device 10 are coupled to one another by a traction cable 110 which is designed as a coupling element of a coupling device and is guided out of the housing 90 in the respective corner piece 92, namely on a side of the corner piece 92, at which this has an insertable pin 112a, b which can be inserted into a respective frame tube 114a, b of the frame parts 70a, b, wherein the traction cable 110 is guided out of the corner piece 92 in such a manner that it runs next to the insertable pin 112 in the respective frame tube 114. The traction cable then exits from the respective frame part 70a, 70b in the area of inner corner pieces 116a and 116b of the respective frame part 70a, 70b and runs freely from one of the corner pieces 116a, b to the other one of the corner pieces 116b, a.

In addition to the respective swivel locking element 96, an actuating element 120a, 120b is provided in each of the housings 90a, 90b and this has a manually actuatable actuating head 122 which is arranged on an upper side of the respective housing 90a, 90b so as to be accessible.

Proceeding from the actuating head 112, a respective traction cable tensioning member 124a, b of the respective actuating element 120a, b extends in the respective housing 90, this tensioning member having two deflection members 126, 128 which are seated on either side of an axis of rotation 130 of the actuating element 120 and between which the traction cable 110 runs with a section 132.

If the respective actuating element 120 is not actuated, these deflection members 126, 128 are in such a position that the traction cable 110 with the section 132 forms a slight, distinctive slant in the respective traction cable tensioning member 124 due to the fact that it runs between the deflection members 126, 128.

If the traction cable 110 extending between the swivel locking elements 96 is, however, intended to be shortened in its overall length in order to exert a pulling force, one of the actuating elements 120 is turned about its axis of rotation 130 and, as a result, a very distinctive loop is formed in the section 132 due to the fact that the section 132 is wrapped increasingly around the deflection members 126, 128 as a result of the traction cable tensioning member 124 being turned and, therefore, a traction effect on the swivel locking elements 96a, b is brought about via the ends 134a, b on account of the smaller length of cable available outside the slant of the section 132 between the ends 134a, b connected to the swivel locking elements 96 and so they transfer from their operative into their inoperative position, in which the locking tongues 100 are drawn into the respective housing 90.

As a result of the stops 106, the traction effect on the two swivel locking elements 96a, b is balanced and so the two swivel locking elements 96a, b can be transferred into the inoperative position of the locking tongues 100 as a result of actuation of one of the actuating elements 120a, b.

This position of the locking tongues 100 is maintained in the first embodiment for such a time until a manual actuation of the actuating head 122 of the respective actuating element 120 is terminated so that the respective actuating element 120 again has the possibility of rotating freely about its axis of rotation 130 and, therefore, turns on account of the pulling force acting on the traction cable 110 as a result of the springs 104 and the swivel locking elements 96 to such an extent that the locking tongues 100 transfer again into their outwardly extended and, therefore, operative position, illustrated in FIG. 3, as a result of rotation of the respective swivel locking element 96. In this position, the traction cable 110 is wrapped around the deflection members 126, 128 only slightly in the area of the respective section 132 and this is appreciably less than the wrapping around in the case of an actuated actuating element 120.

With the protection device according to the invention it is, therefore, possible to release the fixing of the cover 50 by the two fixing devices 62a and 62b when one of the actuating elements 120 is actuated from the side walls 18a, b of the vehicle body due to the fact that both locking tongues 100 are moved out of their operative position in the respective receiving means 66 into an inoperative position and so the entire protection device 10 and, in particular, the cover 50 can be tilted about the locking bolts 54 and, therefore, access to the area 34 of the passenger compartment 16, which is located between the front row of seats 22 and the rear row of seats 24, is possible.

As a result, an operator can, for example, actuate the actuating element 120 via the actuating head 122 on one side of the protection device 10, thereby release the fixing of the cover 50 by the two fixing devices 62a, b and, therefore, pivot the entire cover 50 about the locking bolts 54 in the direction of the headrests 26 in order to place pieces of luggage or other objects in the area 34 of the passenger compartment 16 between the front row of seats 22 and the rear row of seats 24 or remove them from this area of the passenger compartment 16.

Alternatively thereto, it is also conceivable to design the fixing devices 52a, b in the same way as the fixing devices 62a, b so that they can also be released in the same way on account of the coupling via the coupling element 110.

In a second embodiment, illustrated in FIGS. 5 to 8, no swivel locking element 96 is provided in the corner piece 92 but rather a displaceably mounted locking bolt 140 which can be moved out of the housing 90 in a direction of displacement 142 or moved into it.

For the purpose of moving the locking bolt 140, a connecting link drive element 144 is provided which is mounted so as to be pivotable about a pivot axis 146 in the housing 90 and comprises a connecting link member 148, from which a connecting link arm 150 projects, in which a connecting link path 152 is provided in the form of an elongated hole.

A path follower 154 is guided in the connecting link path 152 and this is connected securely to the locking bolt 140.

Figure 5:
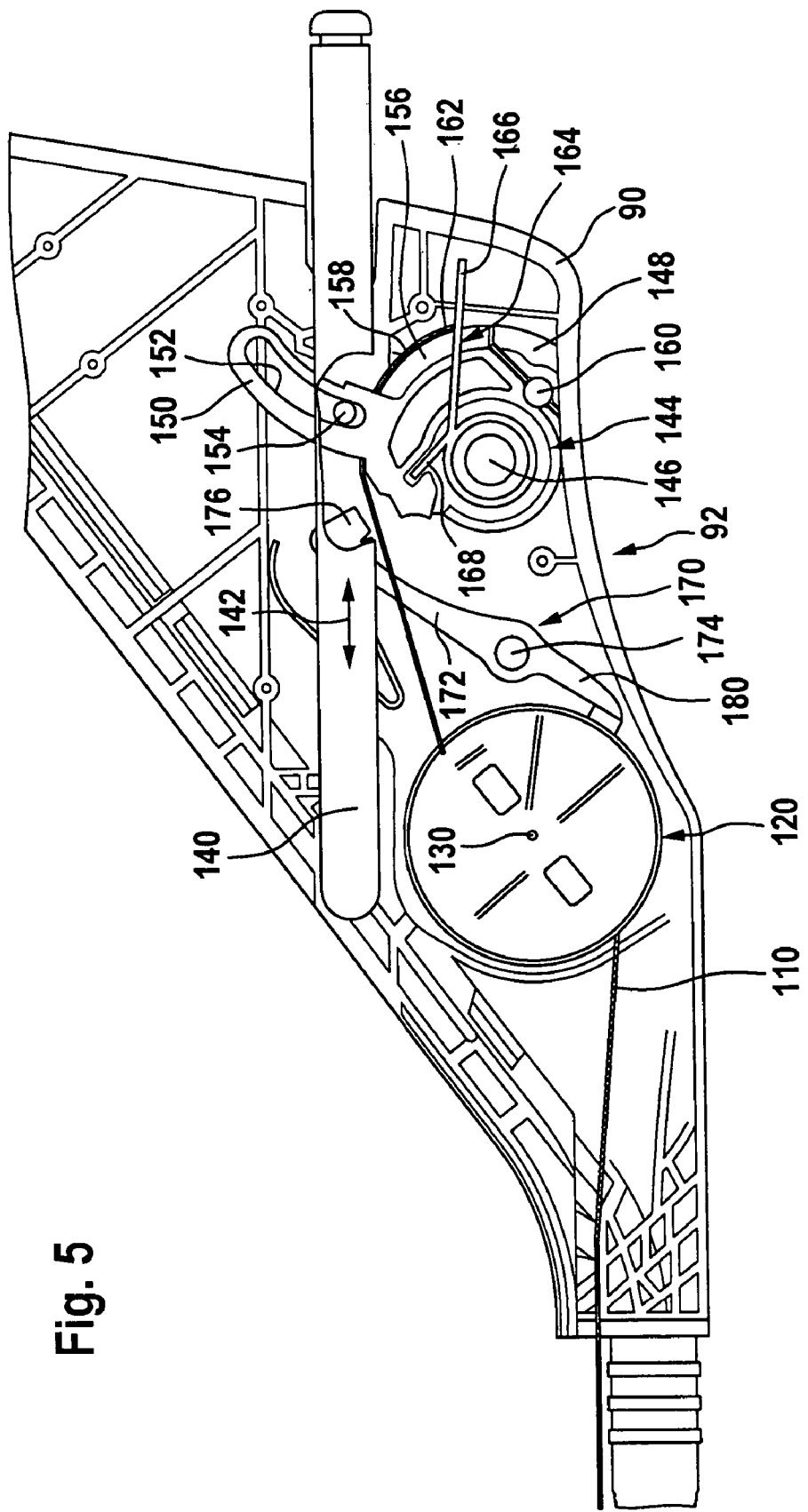
FIG. 5 shows an illustration of a second embodiment of a fixing device of a protection device according to the invention, viewed from below in operative position of the locking element.
Figure 6:
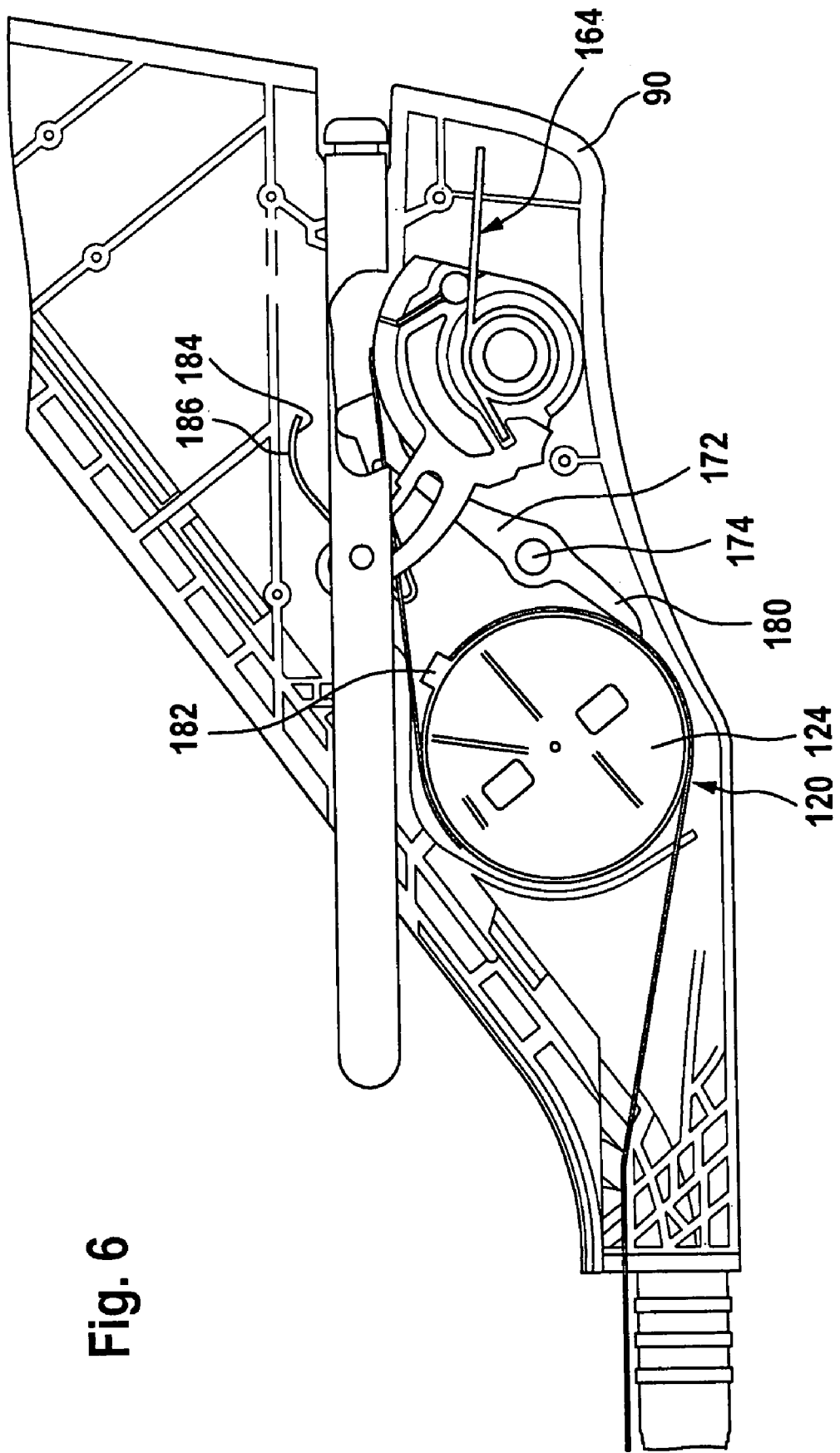
FIG. 6 shows an illustration similar to FIG. 5 in inoperative position of the locking element.

Depending on the rotary position of the connecting link drive element 144, the path follower 154 and, therefore, the locking bolt 140, as well, is displaced in a direction of displacement 142 such that, as a result, the locking bolt 140 can be moved out of the housing 90, as illustrated in FIG. 5, or can be moved into it, as illustrated in FIG. 6.

For the purpose of pivoting the connecting link drive element 144, this is provided with a guide segment 156 for the traction cable 110 which rests on a circumferential surface 158 of the guide segment 156 and is connected to the guide segment 156 at one end 160, proceeding from which an end section 162 can rest on the circumferential surface 158.

A pull on the traction cable 110 causes the guide segment 156 to pivot about the pivot axis 146 so that, as a result, the entire connecting link drive element 144 is pivoted.

The pull on the traction cable 110 is applied in the same way by the actuating element 120 associated with each fixing device, as has been described in conjunction with the first embodiment.

The connecting link drive element 144 is acted upon, in addition, by a leg spring 164, the one leg 166 of which is secured to the housing 90 and the other leg 168 of which is secured to the guide segment 156, in such a manner that it always acts on the locking bolt 140 in the direction of the operative position moved out of the housing 90.

A movement coupling 170 is provided, in addition, between the actuating element 120 provided in the respective housing 90 and the connecting link drive element 144, this coupling releasing or blocking a rotary movement of the connecting link drive element 144 about the pivot axis 146 as a function of a position of the actuating element 120.

For this purpose, the movement coupling 170 comprises a locking lever 172 which can be pivoted about an axis 174 and has at one end a snap-in nose 176 which can be brought into engagement with a snap-in recess 178 in the guide segment 156. The snap-in recess 178 is arranged on the guide segment 156 in such a manner that, as illustrated in FIG. 7, the snap-in nose 176 can lock into the snap-in recess 178 when the guide segment 156 and, therefore, the connecting link drive element 144 is in a position which corresponds to the inoperative position of the locking bolt 140.

Figure 7:
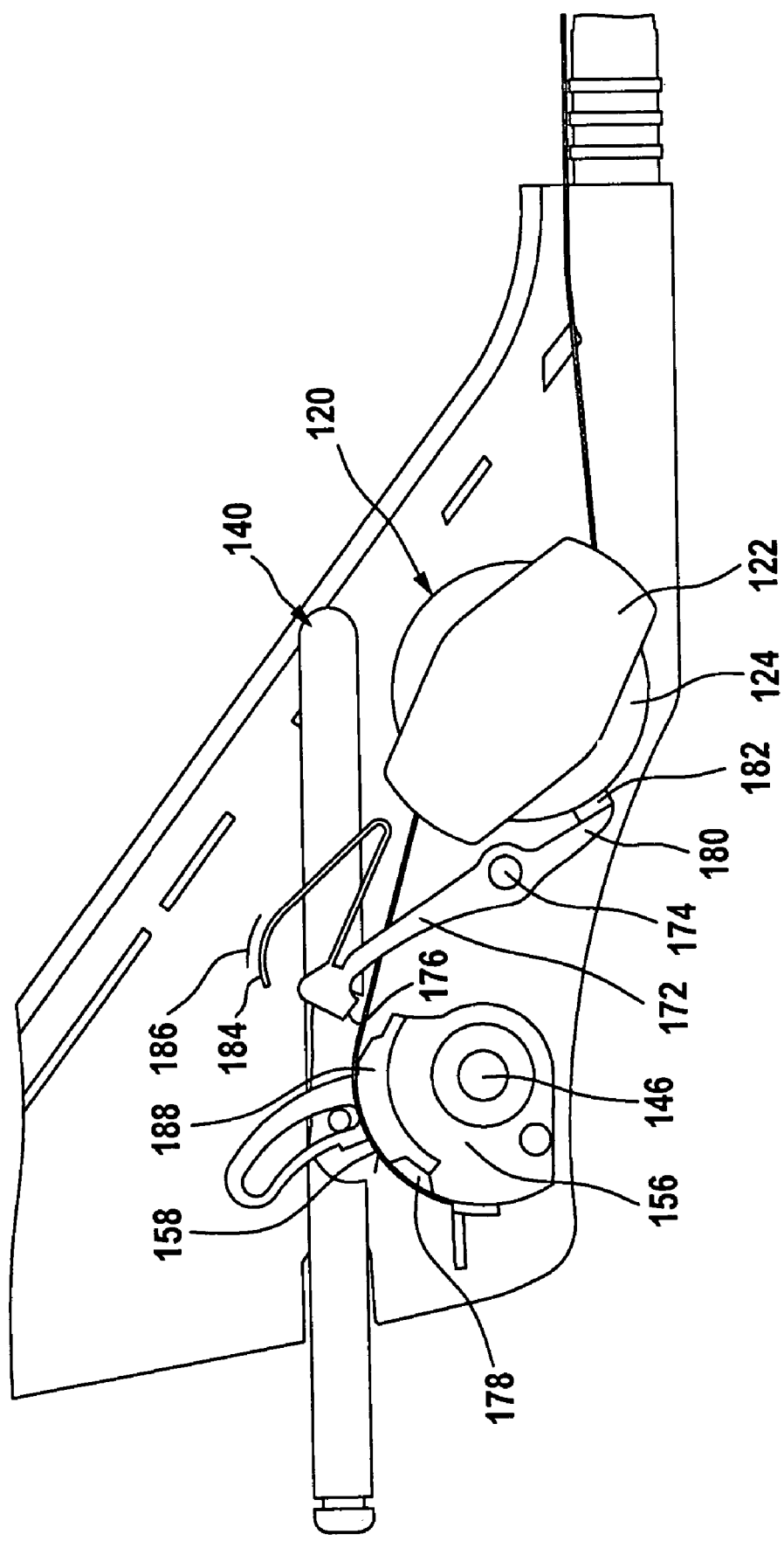
FIG. 7 shows an illustration of the fixing device from above in operative position of the locking element.
Figure 8:
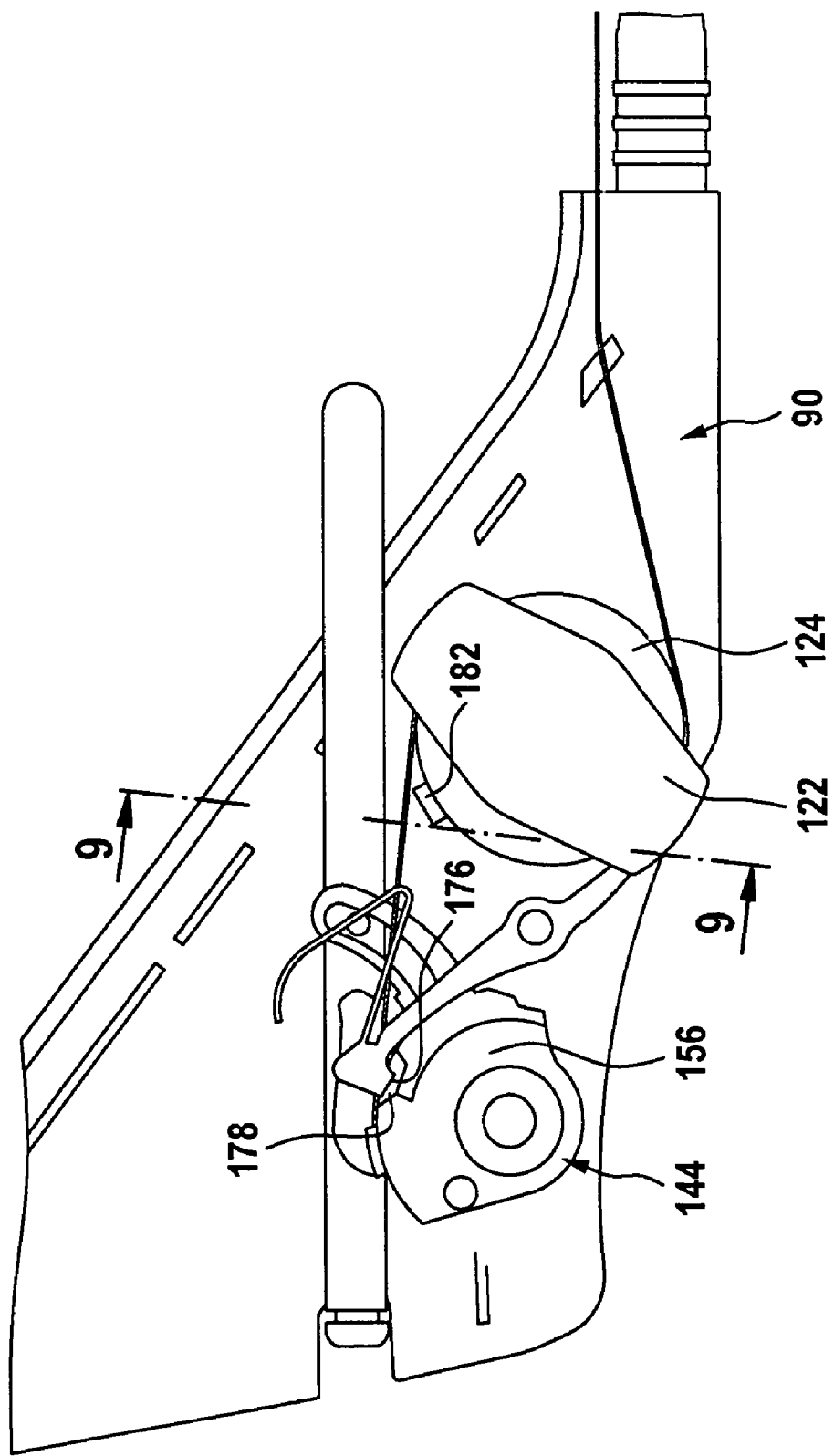
FIG. 8 shows an illustration similar to FIG. 7 in inoperative position of the locking element.

Furthermore, the blocking lever 172 is provided with a touch arm 180 which interacts with an actuating cam 182 on the traction cable tensioning member 124 in order to act on the touch arm 180 in the non-actuated initial position of the actuating element 120, which is illustrated in FIGS. 5 and 7 and allows the operative position of the locking bolt, in such a manner that the blocking lever 172 brings the snap-in nose 176 out of engagement with the snap-in recess 178 and, therefore, the connecting link drive element 144 has the possibility, on account of the effect of the leg spring 164, to turn into a position, in which the locking bolt 140 is moved out of the housing 90 and is, therefore, in its operative position, as illustrated in FIGS. 5 and 7.

In order to keep the blocking lever 172 always acted upon in such a manner that the snap-in nose 176 has the tendency to engage in the snap-in recess 178, the blocking lever 172 is provided with a spring clip 184 which is integrally formed thereon and is supported on an abutment 186 in the housing 90.

Furthermore, the guide segment 156 is provided, in addition, with a guide path 188, along which the snap-in nose 176 can slide for such a time until it engages in the snap-in recess 178. Such sliding of the snap-in nose 176 along the guide path 188 is brought about when, proceeding from the initial position illustrated in FIGS. 5 and 7, the actuating element 120 is, first of all, rotated to such an extent that the actuating cam 182 no longer acts on the touch arm 180 and, therefore, the snap-in nose 176 moves in the direction of the guide segment 156. In this case, the snap-in nose 176 slides along the guide path 188 for such a time until the guide segment 156 is pivoted about the pivot axis 146 to such an extent that the connecting link drive element 144 has moved the locking bolt 140 into the inoperative position moved into the housing 90, illustrated in FIGS. 6 and 8. In this position, the snap-in recess 178 is located opposite the snap-in nose 176 and so it can engage in the snap-in recess 178 and, as a result, prevent any rotation whatsoever of the guide segment 156 and, therefore, of the connecting link drive element 144 in the direction of an operative position of the locking bolt 140 for such a time until the touch arm 180 is again acted upon by the actuating cam 182.

The following is brought about with this movement coupling 170.

If one of the actuating elements 120 is actuated as a result of rotation of the actuating head 122 to unfold the cover 50, both locking bolts 140 of the two fixing devices 62a, 62b are transferred into the inoperative position moved into the housing 90, namely as a result of the fact that in the traction cable tensioning member 124 the winding of the cable around the deflection members 126 and 128 is increased, as already described for the first embodiment, and, therefore, the traction cable 110 acts on both connecting link drive elements 144 and turns them about the pivot axis 146 to such an extent that the locking bolts 140 move into the housing 90 into their inoperative position on account of the interaction of the connecting link path 152 with the path follower 154.

In this moved-in position of the locking bolts 140, the cover 50 can be unfolded and, once the cover 50 has been folded back down again, the cover is again locked with the fixing devices 62a, b as a result of the fact that the actuating element 120, which has been actuated by the operator, is given the possibility of returning from the drawn-in position maintaining the inoperative position of the locking bolts 140 into the initial position allowing the operative position of the locking bolts 140.

As a result, the tension on the traction cable 110 is released and, on account of the rotary movement of the connecting link drive element 144 arranged in the same housing 90 as the manually actuated actuating element 120 being secured by the movement coupling 170, the release of tension on the traction cable 110 causes the connecting link drive element 144 of the fixing device 62a, b located opposite the actuating element 120 used for the manual actuation to move back into the operative position, in which the locking bolt 140 is moved out of the housing 90 so that it can engage in the corresponding receiving means 66a, b in the respective side wall 18a, b.

Further movement of the manually actuated actuating element 120 back in the direction of its initial position causes a further release of tension on the traction cable 110 which leads to movement of the connecting link drive element 144 arranged in the same housing 90 as the manually actuated actuating element 120 back into the position moving the corresponding locking bolt 140 outwards only when the actuating cam 182 actuates the touch arm 180 so that the snap-in nose 176 is moved out of the snap-in recess 178 and the rotary movement of the connecting link drive element 144 is released.

As a result, the operator has the possibility of locking the locking bolts 140 sequentially in the respective receiving means 66a, b in the side walls 18a, b, which is advantageous, in particular, when the cover 50 sags on one side when lifted on one side, for example, when lifted in the area of the side, on which the actuating element 120 is actuated, so that the lifted side of the cover 50, in particular, in the area of the housing 90, the actuating element 120 of which is actuated, is located higher above the belt line 20 of the vehicle body 14 than the side hanging freely downwards, for example, in the area of the oppositely located housing 90.

In order to provide the possibility of keeping the actuating element 120 in the drawn-in position so that both locking bolts 140 are in their inoperative position drawn into the housing 90, the traction cable tensioning member 124 is provided on its side facing an upper wall 190 of the housing 90 with a snap-in nose 192 which can be moved over a snap-in nose 194 of the wall 190, namely immediately prior to the drawn-in position being reached.

In this respect, the snap-in nose 192 has, for example, an inclined slide-on surface 196 with a small inclination as well as an inclined slide-off surface 198 with a greater inclination whereas the snap-in nose 194 has inclined surfaces 202 and 204 with approximately the same inclination on both sides.

Figure 9:
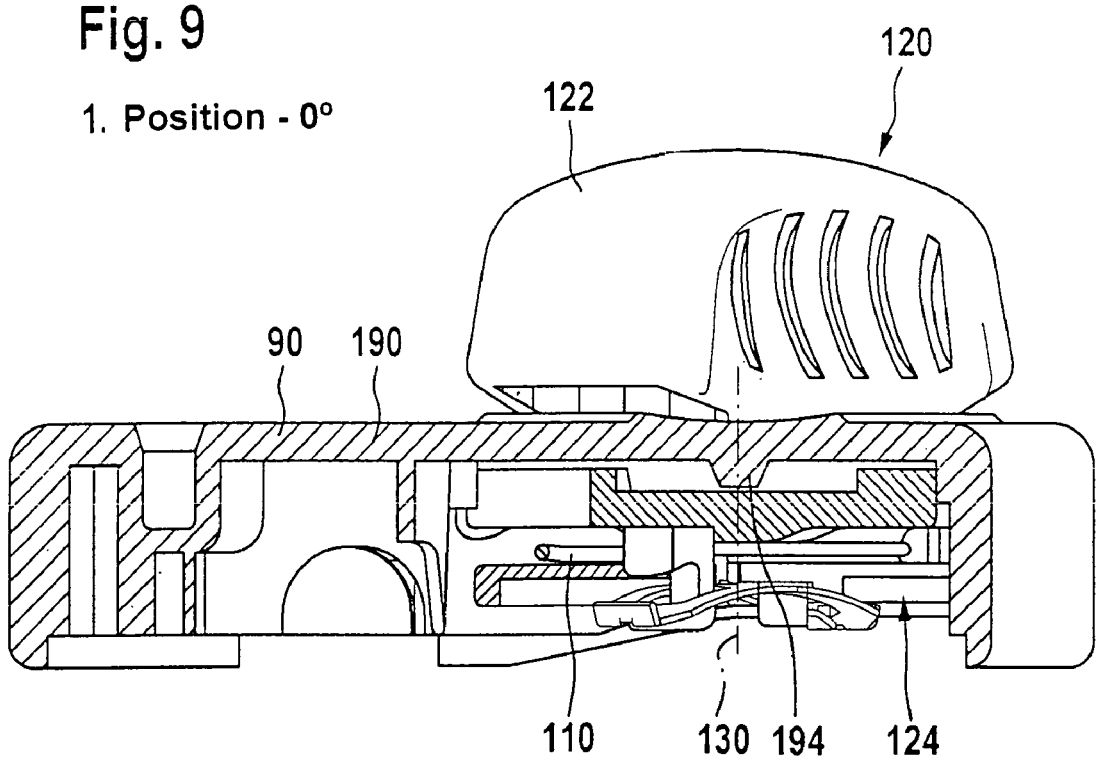
FIG. 9 shows a section along line 9-9 in the initial position of the actuating element.
Figure 10:
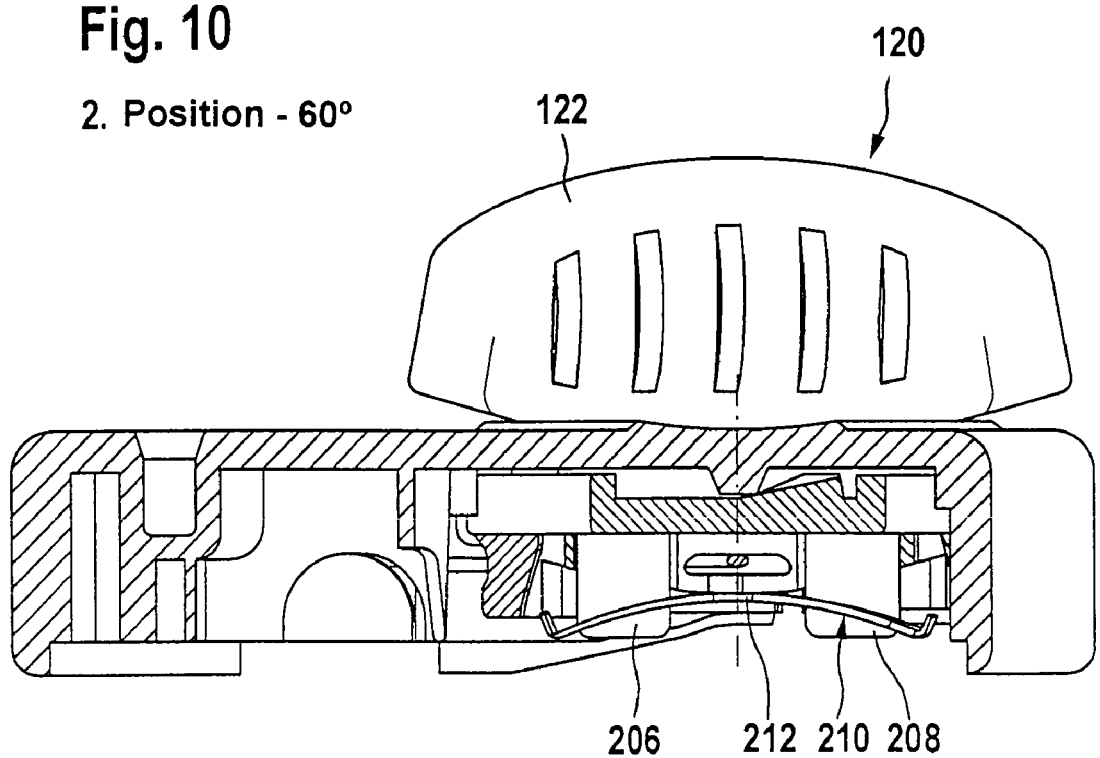
FIG. 10 shows an illustration similar to FIG. 9 prior to the beginning of interaction of snap-in elements.
Figure 12:
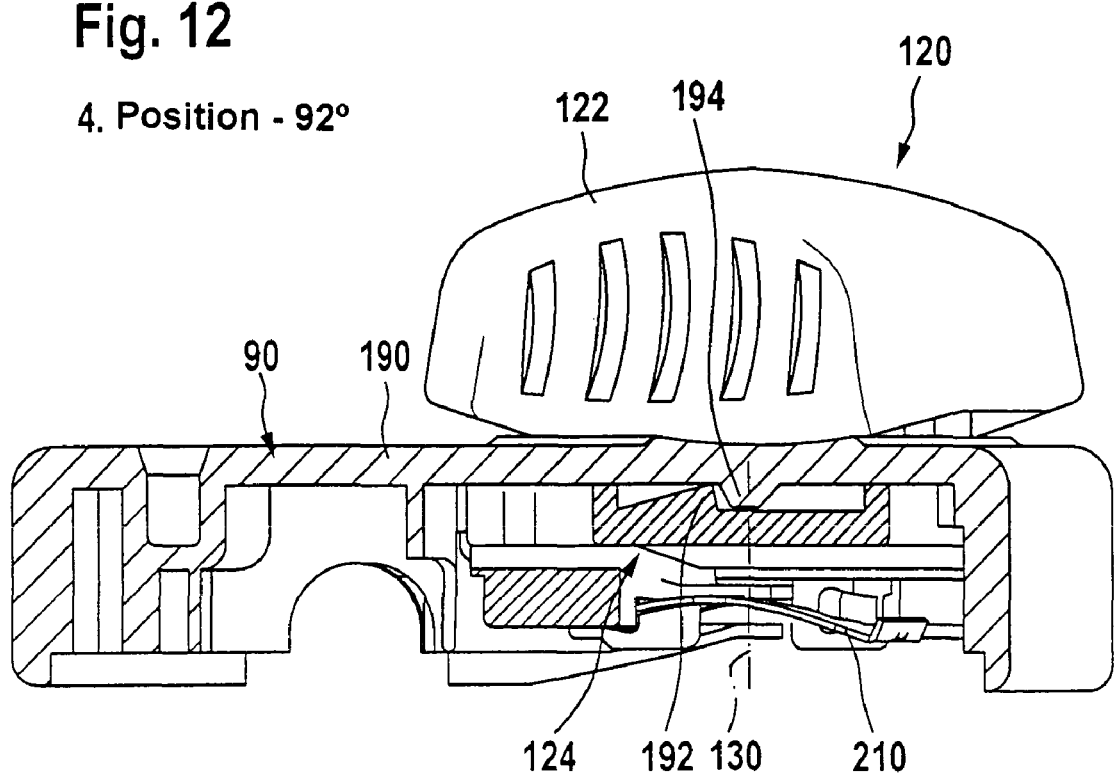
FIG. 12 shows an illustration similar to FIG. 9 of the snap-in connection of the snap-in elements.

If the actuating element 120 is now turned from the initial position illustrated in FIG. 9 into the drawn-in position illustrated in FIG. 12, the snap-in noses 192 and 194 run over one another, wherein the snap-in nose 194 runs over the inclined slide-on surface 196 with a small inclination prior to reaching the drawn-in position and, therefore, only a small torque is required to move the snap-in noses 192 and 194 over one another in order to reach the drawn-in position.

In the drawn-in position, the snap-in noses 192 and 194 therefore prevent the actuating element 120 from turning back again automatically into the initial position.

The inclined slide-off surface 198 which is considerably steeper than the inclined slide-on surface 196 may be overcome only by means of a force acting on the actuating head 122 which is active over a small rotary angle.

So that the snap-in noses 192 and 194 can run over one another, the traction cable tensioning member 124 must have the possibility of moving in the direction towards the axis of rotation 130.

For this reason, the traction cable tensioning member 124 and the actuating head 122 are designed as two separate parts, wherein the actuating head 122 has two pins 206 and 208 which penetrate corresponding recesses in the traction cable tensioning member 124 and on which a leaf spring 210 can be secured which acts on the traction cable tensioning member 124 in the direction of the wall 190 with a central area 212 located between the pins 206 and 208 in order to allow this to deflect away from the wall 190 contrary to the force of the leaf spring 210.

Figure 11:
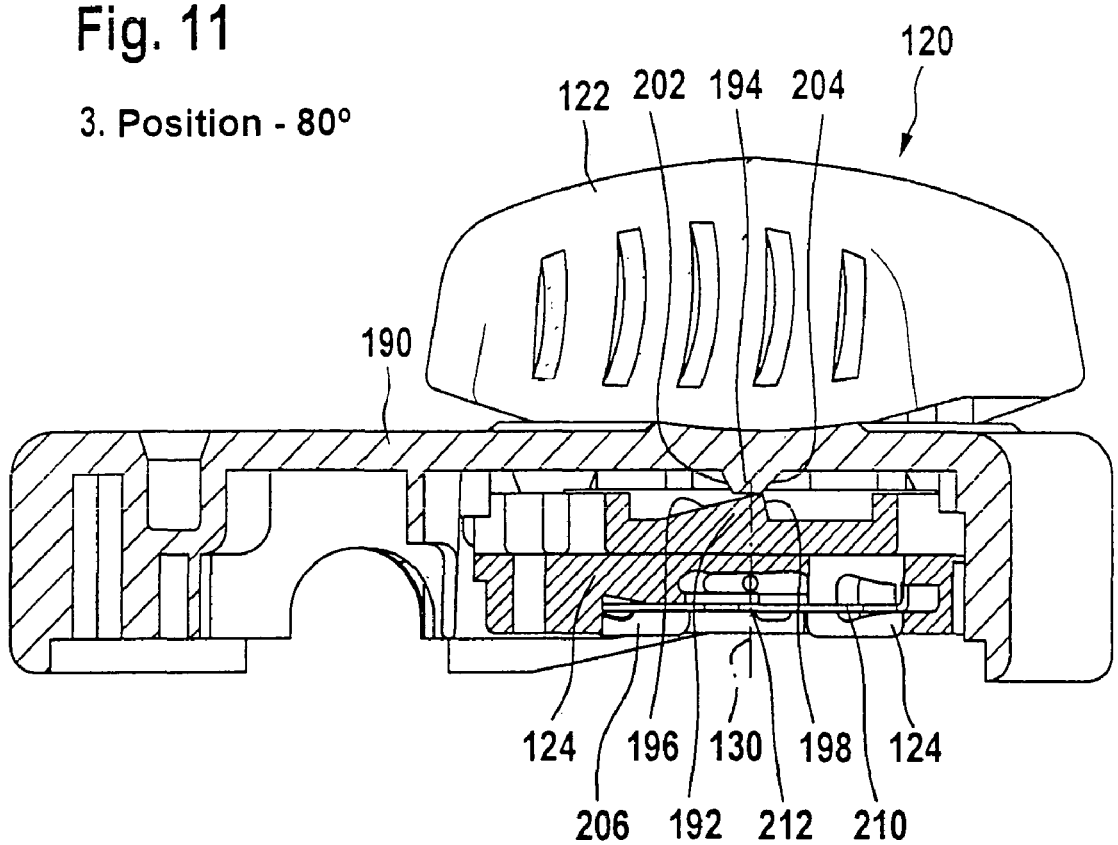
FIG. 11 shows an illustration similar to FIG. 9 with snap-in elements immediately prior to their snap-in connection.

The rotary entrainment between the actuating head 122 and the traction cable tensioning member 124 is brought about via the pins 206 and 208 while the traction cable tensioning member 124, as a result of the leaf spring 210, has the possibility of moving away from the wall 190 of the housing, in particular, when the snap-in noses 192 and 194 are intended to run over one another, as illustrated in FIG. 11.

In this case, the leaf spring 210 is curved away from the wall 190 in the direction of the axis of rotation 130 in the central area 212 between the pins 206 and 208 so that, as a result, the traction cable tensioning member 124 can also move away from the wall 190 in order to be able to move with the snap-in nose 192 over the snap-in nose 194 on the wall 190 until the drawn-in position, illustrated in FIG. 12, is reached, in which the traction cable tensioning member 124 is displaced again in the direction of the wall 190 of the housing 90 on account of the action of the leaf spring 210 to such an extent that the snap-in noses 192 and 194 abut on one another by engaging behind one another.

It is, for example, possible by manually applying torque to the actuating head 122 in the direction of the initial position to again move the traction cable tensioning member 124 in the direction away from the wall 190 in order to be able to move the snap-in nose 192 over the snap-in nose 194 again such that the snap-in connection in the drawn-in position is released and an automatic rotary movement of the actuating element 120 then takes place, in particular, on account of the force of the leg springs 164 acting on the connecting link drive elements 144 via the traction cable 110 in such a manner that the actuating element can turn back into the initial position.

Alternatively thereto, it is possible to have a turning moment acting indirectly on the traction cable tensioning member 124 of the one fixing device 62 in the direction of the initial position due to the fact that the actuating head 122 of the respectively other fixing device 62 is actuated and so additional tension is applied to the traction cable 110 which is sufficient, when the snap-in noses 192 and 194 are of a suitable design, to move the traction cable tensioning member 124 of the one fixing device 62 in the direction of the initial position to such an extent that the snap-in noses 192 and 194 no longer interact.

In a variation of the second embodiment, it is conceivable not to arrange the snap-in elements 192 and 194 such that one of the traction cable tensioning members 124 is not locked until the drawn-in position is reached, as illustrated in FIG. 12, but rather to arrange the snap-in noses 192 and 194 such that they interlock in an intermediate position so that both traction cable tensioning members 124 are to be moved into the intermediate position and are to be locked in this position by the snap-in noses 192 and 194 in order to cause both locking bolts 140 to be moved into the housing 90 into their inoperative position.

Following such a so-called two-sided actuation of the two actuating heads 122 in order to lock the traction cable tensioning members 124 with the snap-in noses 192, 194 of each of the fixing devices 62a, b in the intermediate position, it is possible to release this due to the fact that by actuating the actuating head of the one fixing device 62a, b the snap-in noses 192, 194 of the other fixing device 62b, a disengage and the traction cable tensioning member 124 again moves in the direction of its initial position so that both locking bolts 140 can again transfer into their operative position as a result of the actuating head 122 of the one fixing device 62a, b being turned back manually and the snap-in connection by the snap-in noses 192 and 194 in the intermediate position being overcome.

As for the rest, all those elements of the second embodiment which are identical to those of the first embodiment are provided with the same reference numerals and so, with respect to the description thereof, reference is made in full to the comments on the first embodiment.

Figure 13:
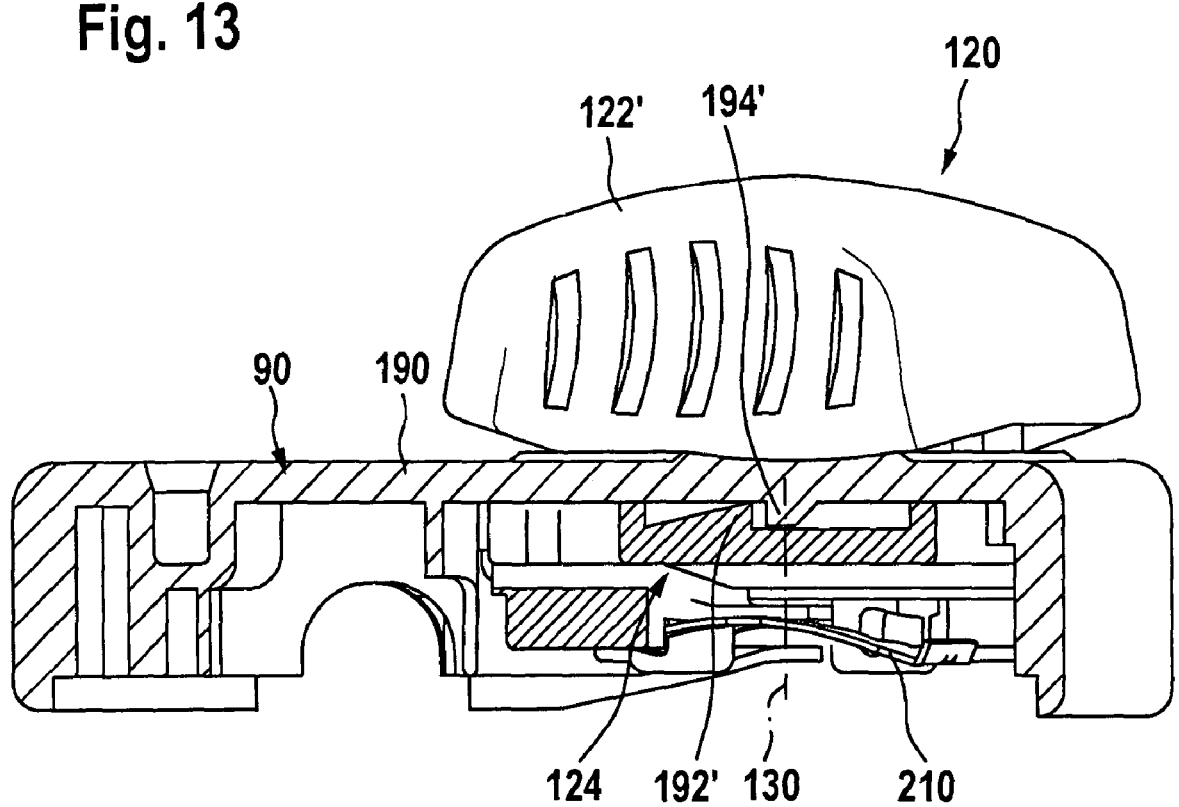
FIG. 13 shows an illustration similar to FIG. 12 of a third embodiment of a protection device with fixing devices.
Figure 14:
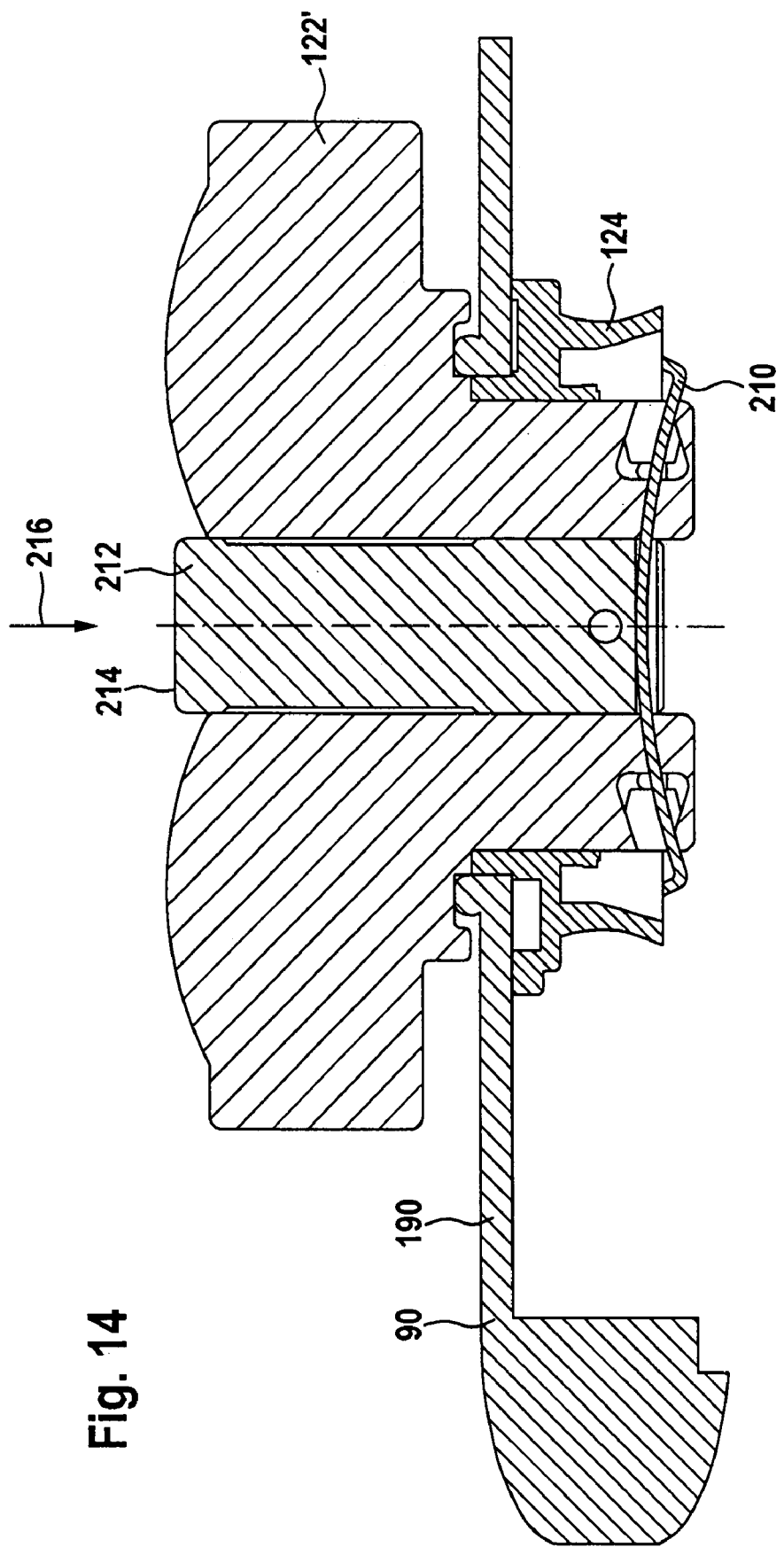
FIG. 14 shows an illustration of a section through an actuating element in the third embodiment and FIG. 15 shows an illustration similar to FIG. 4 of a fourth embodiment of a protection device with fixing devices.

In a third embodiment, illustrated in FIGS. 13 and 14, the snap-in noses 192' and 194' are provided with steep flanks or inclined surfaces so that manual application of a turning moment to the actuating head 122 in the direction of the initial position does not allow the snap-in nose 192' to move over the snap-in nose 194'.

For this reason, as illustrated in FIG. 14, the traction cable tensioning member 124' is connected to an actuating pin 212 which is guided centrally in the actuating head 122' and on which the leaf spring 210 acts and when it is acted upon at its end side 214 in the direction 216 the traction cable tensioning member 124 can be moved in the direction away from the wall 190 so that, in this position, the snap-in nose 192' can be moved over the snap-in nose 194' and their snap-in connection in the drawn-in position can be released.

As for the rest, all those elements of the third embodiment which are identical to those of the first and second embodiments are provided with the same reference numerals and so, with respect to the description thereof, reference is made in full to the comments on these embodiments.

Figure 15:
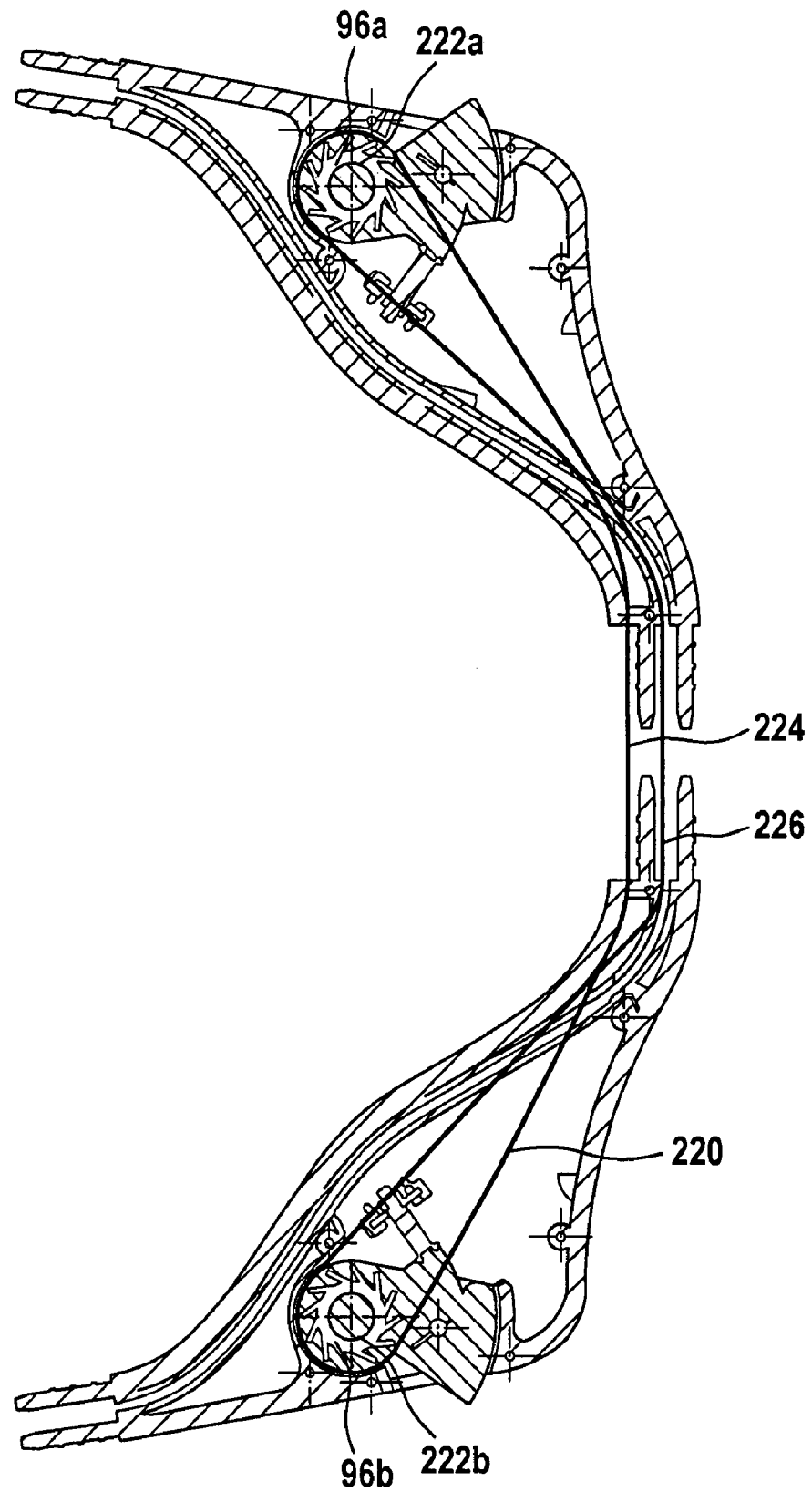

In a fourth embodiment, illustrated in FIG. 15, a continuously circulating traction cable 220 is provided which is guided around a cable guide 222a, b of the respective swivel locking element 96a, b and is, therefore, in a position to couple the two swivel locking elements 96a, b with respect to their rotary movement. In this respect, the traction cable 220 is designed with crossing central pieces 224 and 226 which extend between the cable guides 222a, b such that the respectively other swivel locking element 96a, b executes a pivoting movement into the same operative or inoperative position as the one swivel locking element 96b, a.

Furthermore, it is preferably provided in this embodiment for the swivel locking elements 96a, b to be actuatable directly, for example, to likewise have as an actuating element an actuating head which is not illustrated in FIG. 15 and is arranged so as to project above the respective housing 90 on an upper side.

In this case, it is, therefore, possible to pivot one of the swivel locking elements 96a, b from the inoperative into the operative position or from the operative into the inoperative position directly with the actuating head and, therefore, to bring about the corresponding pivoting of the other swivel locking element 96b, a at the same time.

As for the rest, those elements which are identical to those of the first embodiment are provided with the same reference numerals and so, with respect to their description, reference is made in full to the comments on the first embodiment.

The invention claimed is:

1. Wind stop device mountable on a convertible motor vehicle, comprising:
   a protection element protecting against at least one of draft and radiation, said protection element comprising a wind blocker,
   two fixing devices respectively arranged on oppositely located sides of the protection device for mounting the protection device on a convertible motor vehicle body,
   at least one locking element movable back and forth between an operative position and an inoperative position being mounted in each of said fixing devices,
   an actuating element associated with each of the fixing devices,
   a coupling device for coupling the fixing devices together in such a manner that the at least one locking element of the one fixing device and the at least one locking element of the other, oppositely located fixing device, are transferred together from the operative position into the inoperative position by actuation of one of the actuating elements.

2. Wind stop device as defined in claim 1, wherein the locking elements are transferred actively from the operative position into the inoperative position and actively from the inoperative position into the operative position by the coupling device.

3. Wind stop device as defined in claim 1, wherein the coupling device enables an active action on the locking elements only during the transfer of said locking elements from the operative position into the inoperative position.

4. Wind stop device as defined in claim 1, wherein the coupling device comprises a mechanical coupling element.

5. Wind stop device as defined in claim 4, wherein the coupling element is a traction element.

6. Wind stop device as defined in claim 5, wherein the traction element is a traction cable.

7. Wind stop device as defined in claim 1, wherein the respective actuating element is arranged close to the respective locking element.

8. Wind stop element as defined in claim 1, wherein the actuating element acts on the coupling device.

9. Wind stop device as defined in claim 8, wherein the actuating element acts on a traction element of the coupling device.

10. Wind stop device as defined in claim 9, wherein the actuating element acts on the traction element by causing a transferring motion from areas of the traction element interacting with the respective locking elements.

11. Wind stop device as defined in claim 10, wherein the actuating element acts on the traction element in one section of the traction element by causing a variation in a size of a wrap-around loop of the traction element.

12. Wind stop device as defined in claim 1, wherein the actuating element is securable in a position maintaining an inoperative position of the locking elements.

13. Wind stop device as defined in claim 12, wherein the actuating element has a snap-in element which interlocks with a stationary snap-in element.

14. Wind stop device as defined in claim 1, wherein the locking elements are acted upon by an elastic force storing means in a direction of the operative position.

15. Wind stop device as defined in claim 14, wherein each of the locking elements has an associated elastic force storing means.

16. Wind stop device as defined in claim 1, wherein a movement coupling is provided between the respective locking element and the associated actuating element, said movement coupling bringing about different movements of the locking elements arranged on oppositely located sides of the protection device.

17. Wind stop device mountable on a convertible motor vehicle, comprising:
   a protection element protecting against at least one of draft and radiation,
   two fixing devices respectively arranged on oppositely located sides of the protection device for mounting the protection device on a convertible motor vehicle body,
   at least one locking element movable back and forth between an operative position and an inoperative position being mounted in each of said fixing devices,
   an actuating element associated with each of the fixing devices,
   a coupling device for coupling the fixing devices together in such a manner that the at least one locking element of the one fixing device and the at least one locking element of the other, oppositely located fixing device, are transferred together from the operative position into the inoperative position by actuation of one of the actuating elements, and
   a movement coupling between the respective locking element and the associated actuating element, said movement coupling bringing about different movements of the locking elements arranged on oppositely located sides of the protection device,
   wherein during action on an actuating element in a transfer of the locking elements from the inoperative position into the operative position the movement coupling causes the locking element of the oppositely located fixing device to be transferred first into the operative position and then the locking element associated with this actuating element transfers into the operative position with a delay.

18. Wind stop device as defined in claim 16, wherein the movement coupling comprises a blocking device blocking any transfer of the locking element associated with the actuating element from the inoperative position into the operative position and releasing the blocking when the actuating element on account of a position of the actuating element has allowed the other locking element to transfer into the operative position.

19. Wind stop device as defined in claim 1, wherein the protection device further comprises a sun protection device.

20. Wind stop device as defined in claim 16, wherein the protection device comprises a wind stop device mountable on a convertible vehicle.

21. Wind stop device as defined in claim 20, wherein the wind stop device has a wind blocker.

22. Wind stop device as defined in claim 21, wherein the wind stop device has a cover and the wind blocker is connected to the cover.

* * * * *